United States Patent [19]

Schultz et al.

[11] Patent Number: 5,353,151
[45] Date of Patent: Oct. 4, 1994

[54] COLLAPSIBLE BINOCULAR

[76] Inventors: Cynthia A. Schultz, 302 Belin Manor Dr.; Houston, Tex. 77024; Robert H. Schultz, 2100 Bering Dr. #610, Houston, Tex. 77057

[21] Appl. No.: 44,228

[22] Filed: Apr. 7, 1993

[51] Int. Cl.⁵ .............................................. G02B 7/02
[52] U.S. Cl. .................... 359/408; 359/407; 359/474
[58] Field of Search ............... 359/408, 474, 881, 407, 359/409, 480

[56] References Cited
U.S. PATENT DOCUMENTS 4,239,328 12/1980 Justice, Sr. et al. .
4,268,111 5/1981 Green et al. .
4,478,498 10/1984 Ohno .
4,486,079 12/1984 Ueda ................................... 359/408
4,773,747 9/1988 Bresnahan .
4,846,553 7/1989 Rice .................................... 359/408
4,964,709 10/1990 Hoeptner .
5,181,139 1/1993 Benitez .

*Primary Examiner*—Eugene R. LaRoche
*Assistant Examiner*—Vu Le
*Attorney, Agent, or Firm*—Vaden, Eickenroht, Thompson, Boulware & Feather

[57] ABSTRACT

A collapsible binocular comprising a substantially rectangular open-sided housing and an elongated side wall member is provided. Objective lens means and eyepiece lens means maintain the construction of the binocular and provide protection for the lenses.

9 Claims, 3 Drawing Sheets

COLLAPSIBLE BINOCULAR

FIELD OF THE INVENTION

The present invention relates generally to the field of optical instruments, and more particularly, to a collapsible binocular that fits into a pocket or other small space when collapsed.

BACKGROUND AND SUMMARY OF THE INVENTION

Collapsible binoculars may be used at sporting events, concerts, operas, amusement parks and the like to enhance the view of distant objects. Such binoculars have highly practical characteristics and are generally inexpensive.

Collapsible and foldable binoculars are known in the prior art. Disadvantages, however, exist with the prior art binoculars. Many of the binoculars in the prior art are formed from a single blank having complicated fold arrangements to enable the binocular to be collapsed. Some of the binoculars, when collapsed, leave the lenses unprotected, and therefore, the lenses are easily scratched or damaged. The lenses are also unprotected when the binocular is being used. Other types of collapsible binoculars are not suited for convenient storage. The lenses of the binocular disclosed in U.S. Pat. No. 4,268,111 protrude from the collapsed body and therefore, the binocular is not completely flat when collapsed or folded. Protruding lenses add cumbersome bulk to the binocular when it is collapsed, and are also more likely to be broken or damaged. The disadvantage of unprotected lenses has been overcome in U.S. Pat. Nos. 4,239,328, and 4,478,498 by providing a case in which to store the folded binocular when it is not in use. In order to fit into the case, the binoculars have narrowly spaced fold lines which reduce the overall strength and durability of the binocular. Furthermore, the case must be stored or held when the binocular is being used.

In U.S. Pat. No. 4,964,709, a visor which folds over the objective lens to protect the lenses is provided. A large number of fold lines are required to enable collapsing and folding the binocular, which make the binocular unsturdy. The collapsible binocular of U.S. Pat. No. 4,773,747 has modified visors on both the front and rear walls to protect the lenses. The visor on the front wall, however, prevents properly positioning the eyes near the eyepiece lenses.

According to the present invention, there is provided a collapsible binocular comprising a substantially rectangular open-sided housing having a front wall formed with a pair of objective lens apertures and a rear wall formed with a pair of eyepiece lens apertures. The top, bottom, front, and rear walls are integrally connected, and a flap is integrally connected to the front wall for attaching the top wall to the front wall. The top and bottom wall each have an intermediate transverse fold line. An elongated side wall member having a centered portion formed with a pair of objective lens apertures, a left side wall and right side wall each integrally connected to an end having an eyepiece aperture is affixed to the housing by an objective lens means and an eyepiece lens means. The objective lens means comprises a pair of objective lenses, a unitary objective lens case and a unitary objective lens case clip. The eyepiece lens means comprises a pair of eyepiece lenses, a unitary eyepiece lens case and a unitary eyepiece lens case clip.

The unitary lens cases and clips are flexible and add durability and strength to the binocular. The lens cases and clips also protect the lenses when the binocular is being used and when collapsed and not in use. When the present invention is assembled, the objective lens apertures will be in alignment and the eyepiece lens apertures will be in alignment so as to place the eyepiece lens apertures in coincidence and in longitudinal alignment with the objective lens apertures. Fold lines on the housing and side wall member enable collapsing the binocular from an extended position to a collapsed position.

It is therefore, an object of the present invention to provide a collapsible binocular which overcomes the disadvantages of the configurations described above.

It is another object of this invention to provide a collapsible binocular wherein the eyepiece and objective lenses are protected when the binocular is in use or being stored.

It is another object of this invention to provide a collapsible binocular wherein the lenses are held by flexible, unitary lens cases and clips which add durability and strength to the body of the binocular.

These and other objects, advantages and features of the present invention will be apparent to those skilled in the art from reading the specification including the attached drawings and appended claims.

DETAILED DESCRIPTION OF THE PREFERRED EMBODIMENT

Figure 1A:
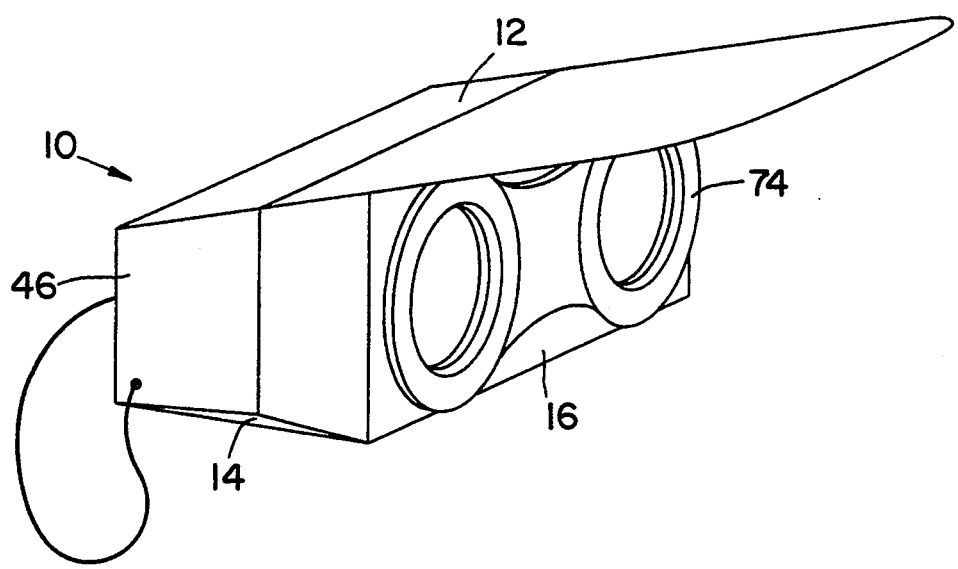
FIG. 1a is a front perspective view of the preferred embodiment of the present invention.
Figure 1B:
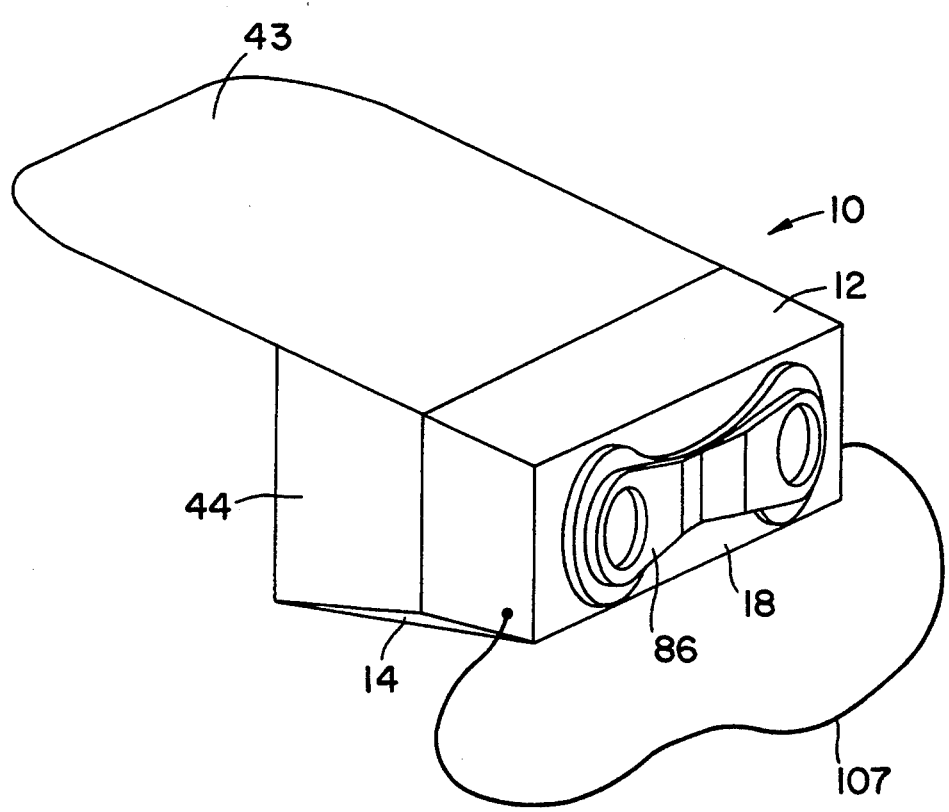
FIG. 1b is a rear perspective view of the preferred embodiment of the present invention.

Referring to the drawings, FIG. 1a shows a front perspective view of the collapsible binocular of the present invention in its expanded state, ready for use and generally designated 10. FIG. 1b shows a rear perspective view of the binocular in its expanded state. Top wall 12, bottom wall 14, front wall 16, and rear wall 18 of binocular 10 are formed from the blank 20 shown in plan view in FIG. 2. Objective lense case 74 is shown.

Figure 2:
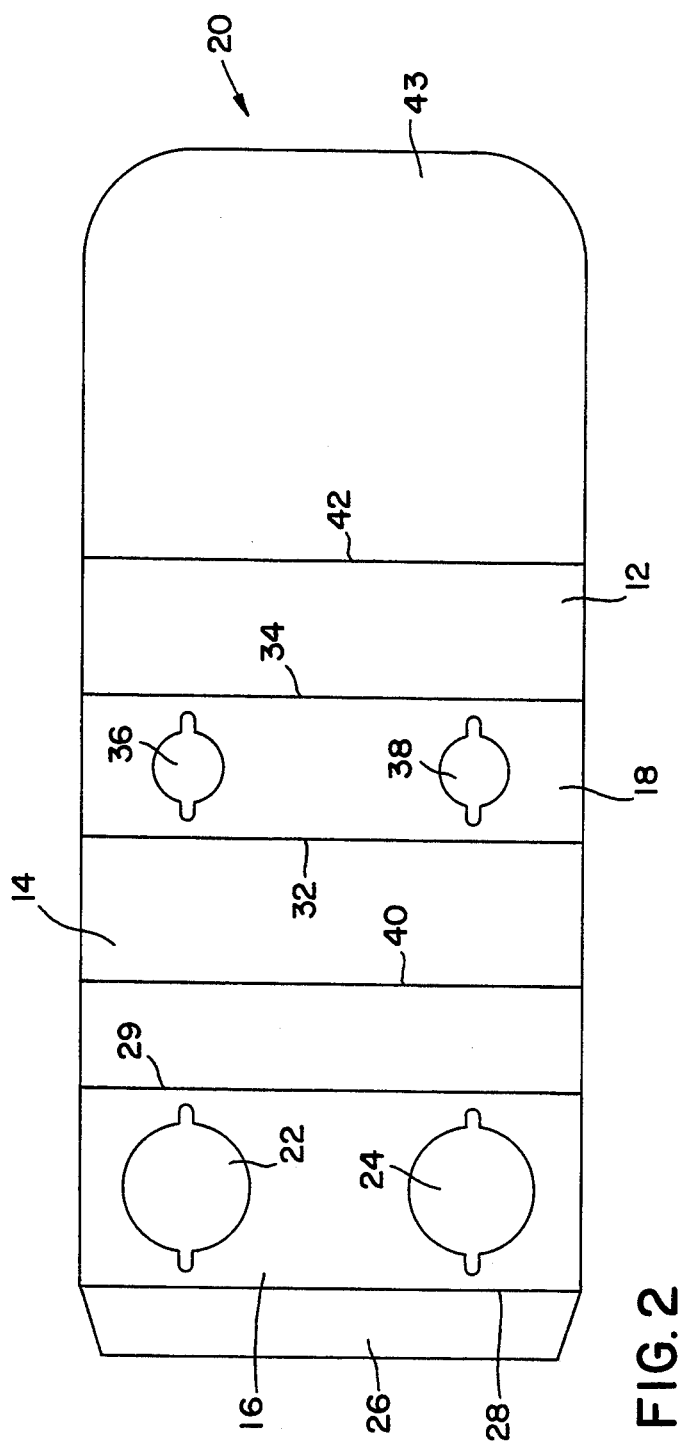
FIG. 2 is a plan view of a blank to be folded into the open-sided housing of the present invention.

Blank 20 shown in FIG. 2, when assembled, forms a substantially rectangular open-sided housing and a visor. Front wall 16 is formed with objective lens apertures 22 and 24, and is integral with flap 26 along fold line 28. Flap 26 is affixed to the under side of top wall 12 when the binocular is assembled. Bottom wall 14 is integral with the lower edge of front wall 16 at fold line 29 and with rear wall 18 at fold line 32. Rear wall 18 is formed with a pair of eyepiece lens apertures 36 and 38. Preferably, rear wall 18 will be narrower than front wall 16 to provide a streamline, tapered appearance when the binocular is assembled. Rear wall 18 is integral with top wall 12 at fold line 34. Top wall 12 is substantially longer than bottom wall 14 and extends beyond front wall 16 to form visor 43. Visor 43 shields the objective lenses from excessive light and glare. Further, visor 43 provides a substantial surface for displaying advertisements, designs or other art work or messages on the binocular. Bottom wall 14 is formed with transverse fold line 40 and top wall 12 is formed with transverse fold line 42.

Figure 3:
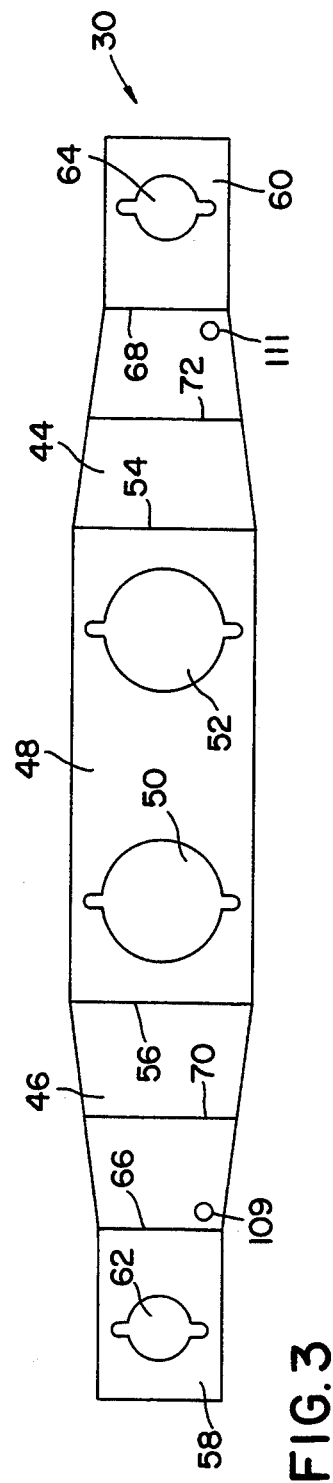
FIG. 3 is a plan view of a side wall member of the present invention.

FIG. 3 shows elongated side wall member 30, which when assembled with blank 20, forms left side wall 44 and right side wall 46. Center portion 48 is formed with objective lens apertures 50 and 52. Center portion 48 is integral with side wall 44 and 46 at fold lines 54 and 56, respectively. Side wall member end 58 ie formed with eyepiece lens aperture 62 and side wall member end 60 is formed with eyepiece lens aperture 64. End 58 is integral with right side wall 46 along fold line 66. End 60 is integral with left side wall 44 at fold line 68. Side wall 44 is formed with lateral fold line 70 and side wall 46 is formed with lateral fold line 72.

When the binocular is assembled, center portion 48 will be adjacent to the interior surface of front wall 16 so that objective lens apertures 50 and 52 are aligned with objective lens apertures 22 and 24. Ends 58 and 60 will be adjacent the interior surface of rear wall 18 so that eyepiece lens apertures 62 and 64 are aligned with eyepiece lens apertures 36 and 38. The eyepiece lens apertures are in coincidence and in longitudinal alignment with the objective lens apertures. Flap 26 is adhesively secured to the under side of top wall 12 such that rear wall 18 and front wall 16 are parallel. Securing flap 26 to top wall 12 fixes the optical length for the optical system.

It is preferred that blank 20 and side wall member 30 are made from a semi-rigid material. Particularly suitable is chipboard, which may be readily folded and scored to provide integral connections in the positions of fold lines 28, 29, 32, 34, 54, 56, 66, and 68, as described above. Alternate embodiments may be made from cardboard or a suitable plastic material. The assembly of the collapsible binocular of the present invention is simplified over those known in the art, and therefore, may be assembled quickly and at a lower production cost. The use of a separate blank and side wall member enhances durability of the binocular while simplifying the production and manufacturing of the binocular. The large surface of visor 43 enables the production of binoculars having complicated, multi-colored designs on the visor and top wall.

Figure 4:
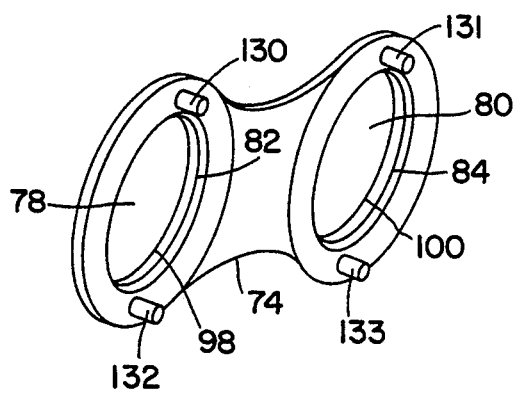
FIG. 4 is a perspective view of the objective lens case of the present invention.
Figure 5:
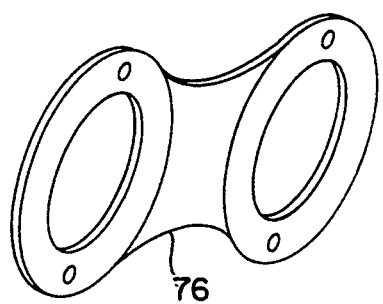
FIG. 5 is a perspective view of the objective lens case clip of the present invention.

An objective lens means is attached to front wall 16 and center portion 48. The objective lens means comprises objective lenses, a unitary objective lens case, and a unitary objective lens case clip. Objective lens case 74 with objective lenses 78 and 80 is shown in FIG. 4. Objective lens case clip 76 is shown in FIG. 5. Objective lenses 78 and 80 rest on shoulders 82 and 84 of objective lens case 74. The objective lenses are preferably made from glass to provide greater optical qualities than plastic lenses. Objective lenses 78 and 80 are slightly greater in diameter than the objective lens apertures such that the lenses are pressed against the periphery of the objective lens apertures when objective lens case 74 is in position against front wall 16. Ridge 98 surrounds objective lens 78 and ridge 100 surrounds the surface of objective lens 80. Ridges 98 and 100 provide a protective barrier around the objective lenses that protects the lenses from damage and scratching when the binocular is in use as well as when it is collapsed and not in use. In the preferred embodiment of the invention, objective lens case clip 76 snap fits onto objective lens case 74 at pins 130, 131, 132, and 133, and secures center portion 48 to front wall 16.

Figure 6:
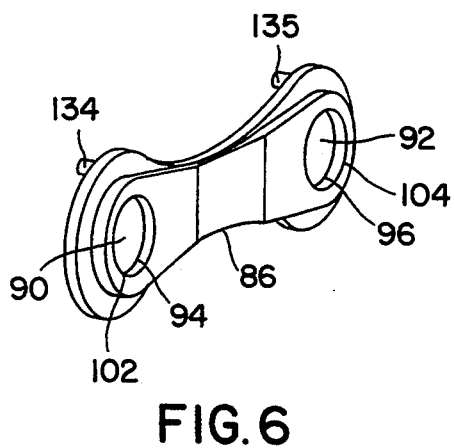
FIG. 6 is a perspective view of the eyepiece lens case of the present invention.
Figure 7:
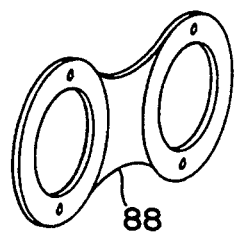
FIG. 7 is a perspective view of the eyepiece lens case clip of the present invention.
Figure 8:
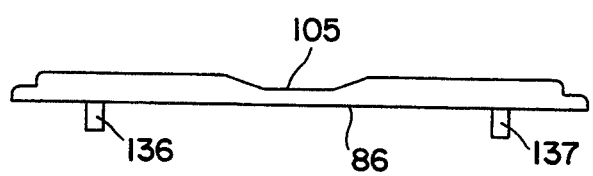
FIG. 8 is a side view of the eyepiece lens case of FIG. 6.

An eyepiece lens means is attached to rear wall 18 and ends 58 and 60. The eyepiece lens means comprises eyepiece lenses, a unitary eyepiece lens case, and a unitary eyepiece lens case clip. Eyepiece lens case 86 with eyepiece lenses 90 and 92 is shown in FIG. 6. Eyepiece lens case clip 88 is shown in FIG. 7. Eyepiece lenses 90 and 92 rest on shoulders 94 and 96 of eyepiece lens case 86. The eyepiece lenses are preferably made from glass to provide greater optical qualities than plastic lenses. Eyepiece lenses 90 and 92 are slightly greater in diameter than the eyepiece lens apertures such that the lenses are pressed against the periphery of the eyepiece lens apertures when eyepiece lens case 86 is in position against the exterior surface of rear wall 18. Similarly to the ridges on objective lens case 74, ridges 102 and 104 provide a protective barrier around the eyepiece lenses that protects the lenses from damage and scratching when the binocular is in use as well as when it is collapsed and not in use. In the preferred embodiment of the invention, eyepiece lens case clip 88 snap fits onto eyepiece lens case 86 at pins 134 and 136 seen in FIG. 6, and 137 and 138 seen in FIG. 8, and secures ends 58 and 60 to rear wall 18. FIG. 8 shows a side view of eyepiece lens case 86. Eyepiece lens case 86 is formed to have depression 105 for accommodating the bridge of the nose of a user of the binocular. Depression 105 allows the user to comfortably place the binocular near the eyes at the desired location for viewing through the binocular. Depression 105 and the unitary lens cases and clips allow the user to maintain a constant interpupillary distance when viewing distant objects.

The lens cases and clips are made from durable and flexible materials such as neoprene or other elastomer material and are of unitary construction. Such materials are durable and strong, and enable the binocular of this invention to be used repeatedly without coming apart or losing its ability to be expanded and collapsed. Neoprene and elastomer materials may have colors or scents, such as pina colada, strawberry, for example, added during preparation so that alternate embodiments of the invention may have lens cases and clips of various combinations of color and odor. The unitary lens cases and clips hold the side walls in place, provide strength and durability to the binocular, and protection to the lenses. The useful life of the binocular is also increased by the lens cases and clips.

Figure 9:
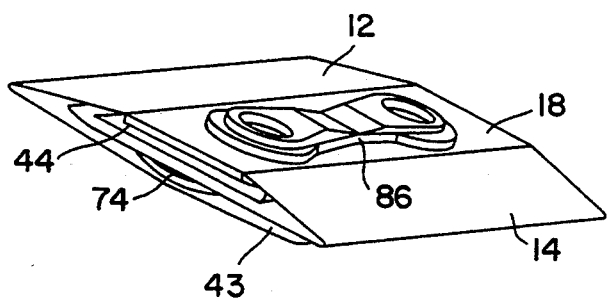
FIG. 9 is a perspective view showing the present invention in a collapsed position.

FIG. 9 shows the binocular in the collapsed state. The binocular may be readily collapsed by applying pressure on rear wall 18 and visor 43 to urge the two together. When pressure is applied as indicated, top wall 12 and bottom wall 14 deflect outwardly away from each other and bend along transverse fold lines 40 and 42. Simultaneously, side walls 4 and 46 deflect inward at lateral fold lines 70 and 72. When the binocular is collapsed, visor 43 covers the objective lenses in the objective lens case, providing extra protection to the lenses. The collapsed binocular has a very thin profile and may be inserted into a pocket or other small space.

Alternatively, the binocular maybe carried around the neck by looping, flexible handle 107, shown in FIGS. 1 and 2. In the preferred embodiment, handle 107 is an elasticized string mounted to the binocular at openings 109 and 111, shown in FIG. 3.

From the foregoing it will be seen that this invention is one well adapted to attain all of the ends and objects hereinabove set forth, together with other advantages which are obvious and which are inherent to the apparatus and structure.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A collapsible binocular comprising:

a substantially rectangular open-sided housing having a front wall formed with a pair of objective lens apertures, a rear wall formed with a pair of eyepiece lens apertures, a bottom wall integrally connected to the rear wall at its lower edge, a top wall integrally connected to the upper edge of the rear wall and extending beyond the front wall to form a visor, a flap integrally connected to the upper edge of the front wall for attaching the top wall to the front wall such that the front and rear wall are parallel to each other, and the walls and the flap being formed from a bland having adjoining edges between each of the walls and the flap defining fold lines and with the top and bottom wall each having an intermediate transverse fold line;

an elongated side wall member having a center portion formed with a pair of objective lens apertures, the center portion integrally connected to a left side wall portion and right side wall portion, each side wall portion integrally connected to an end having an eyepiece aperture, and the side wall portions each having a lateral fold line;

the objective lens apertures in the front wall and the center portion aligned such that the center portion is adjacent the front wall at its inner surface;

the eyepiece lens apertures in the rear wall and the ends aligned and the ends adjacent the rear wall at its inner surface so as to place the eyepiece lens apertures in coincidence and in longitudinal alignment with the objective lens apertures;

an objective lens means comprising a pair of objective lenses, a unitary objective lens case and a unitary objective lens case clip for providing strength and durability attached to the front wall and center portion such that the objective lenses cover the objective lens apertures, and an eyepiece lens means comprising a pair of eyepiece lenses, a unitary eyepiece lens case and a unitary eyepiece lens case clip for providing strength and durability attached to the rear wall and ends such that the eyepiece lenses cover the eyepiece lens apertures, and the fold lines enabling collapsing the binocular from an extended position to a collapsed position, during which the top and bottom walls move relatively apart and the front and rear walls move relatively toward each other whereby the visor section folds over the objective lens means.

2. The collapsible binocular of claim 1, wherein the rear wall is narrower than the front wall.

3. The collapsible binocular of claim 1, wherein the objective lens case and clip are comprised of neoprene.

4. The collapsible binocular of claim 1, wherein the eyepiece lens case and clip are comprised of neoprene.

5. The collapsible binocular of claim 1, wherein the opensided housing and the side wall member are formed from a semi-rigid material.

6. The collapsible binocular of claim 5, wherein the semi-rigid material is chipboard.

7. The collapsible binocular of claim 5, wherein the semi-rigid material is cardboard.

8. The collapsible binocular of claim 5, wherein the semi-rigid material is sheet plastic.

9. The collapsible binocular of claim 1, wherein a looping, flexible handle is connected to the side walls.

* * * * *